Oct. 22, 1929.  J. NAUD ET AL  1,733,069
DOG RACE TRACK
Filed Feb. 26, 1927  2 Sheets-Sheet 2
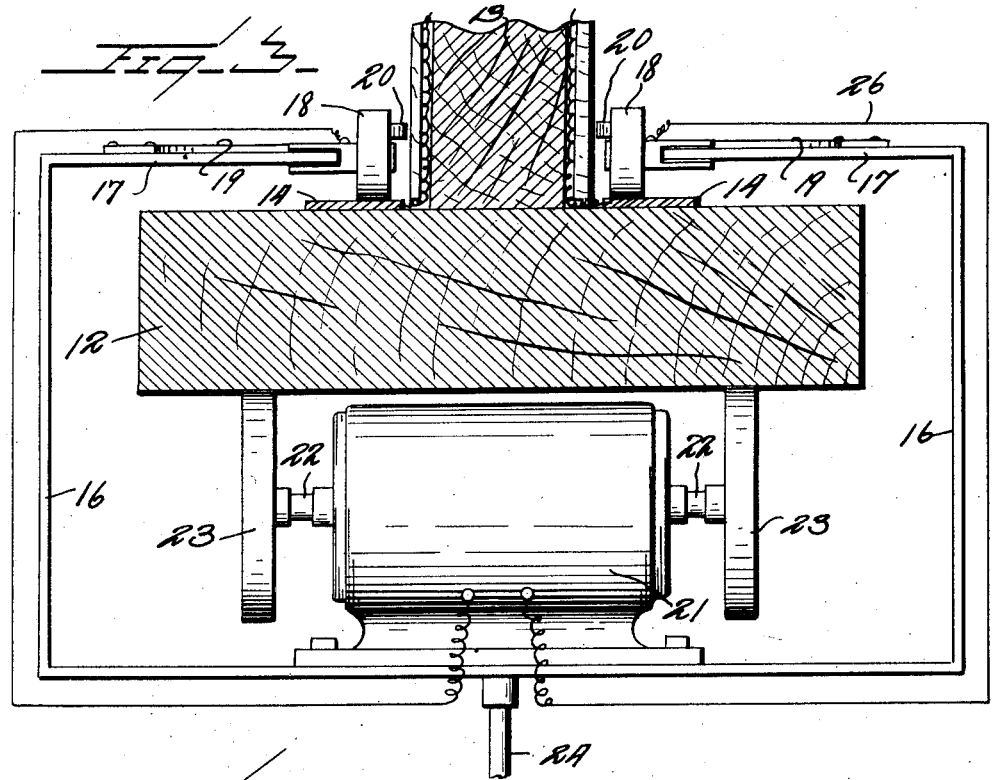
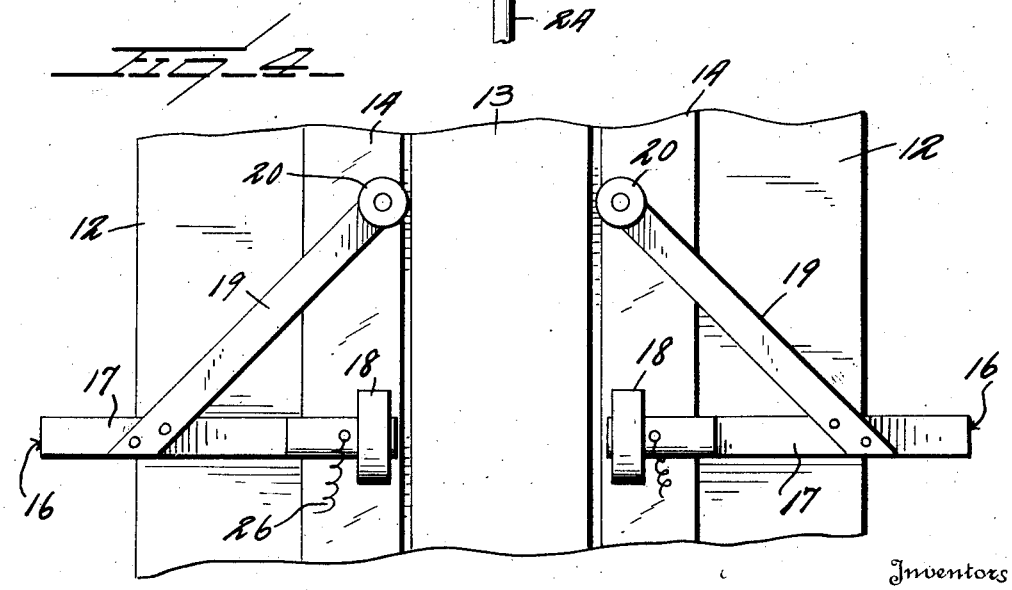
Inventors
J. Naud
& S. Noche
By Watson E. Coleman
Attorney Patented Oct. 22, 1929

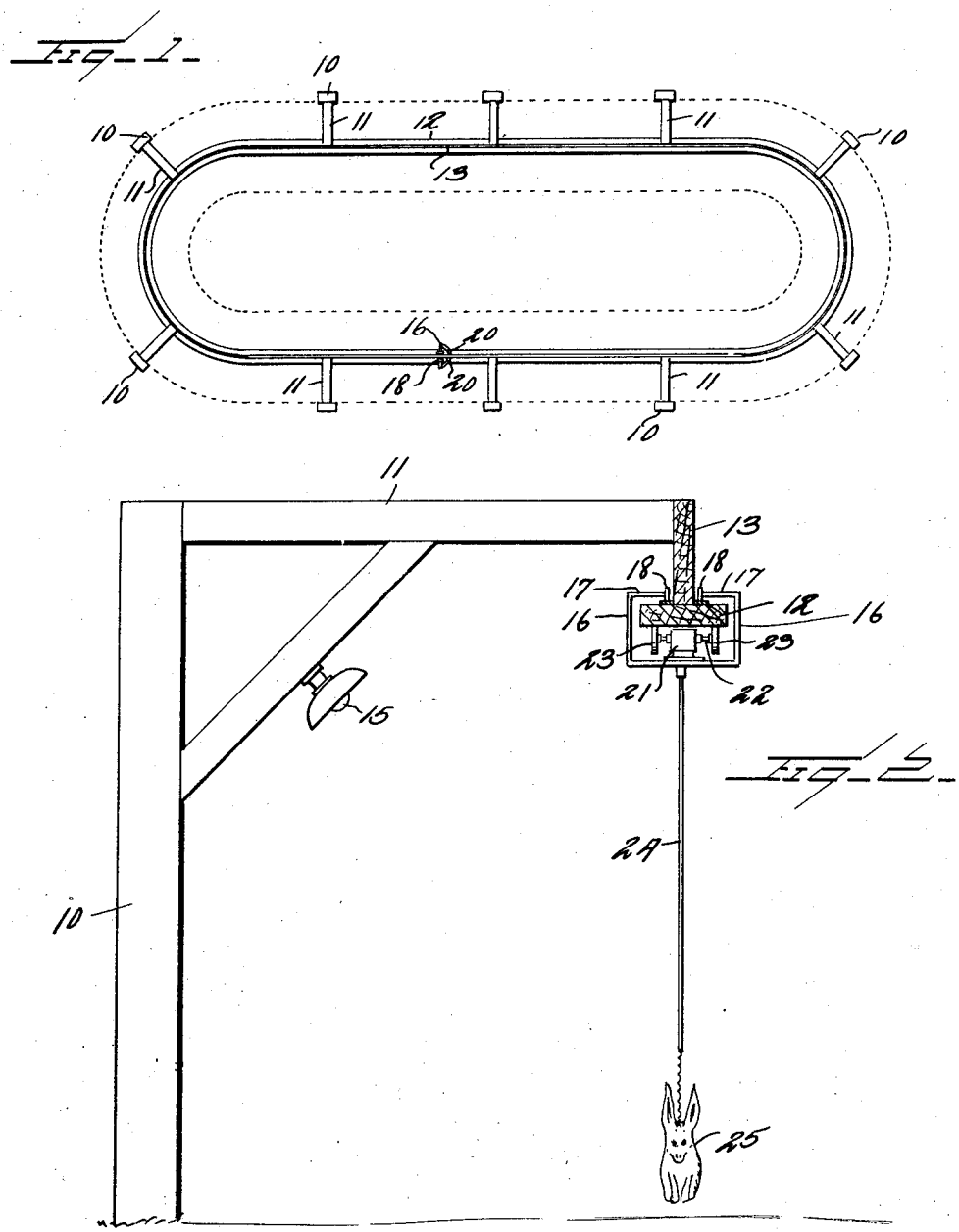

1,733,069

UNITED STATES PATENT OFFICE

JACK NAUD AND SPERO MOCHE, OF TAMPA, FLORIDA

DOG RACE TRACK

Application filed February 26, 1927. Serial No. 171,304.

This invention relates to race tracks and particularly to tracks upon which dogs are raced by causing the dogs to follow after a lure or dummy animal usually consisting of a stuffed rabbit, fox, or the like, this lure being caused to move around the track and the dogs chasing after it.

The general object of the present invention is to provide a construction of this character which will be relatively cheap to set up, which provides an overhead structure upon which the trolley operates, the trolley carrying a downwardly extending rod upon which the lure is supported, and which provides for a trolley of relatively light, simple, and cheap construction.

A further object is to provide a construction which will permit of a trolley being readily changed and a broken or damaged trolley removed in case of any stoppage of the race due to an accident.

A still further object is to provide a construction of this character which permits the dogs to be raced on ordinary ground or over an ordinary track and which requires no underground construction for the trolleys and, therefore, may be installed at a minimum expense.

Our invention is illustrated in the accompanying drawings wherein:—

Figure 1 is a plan view of a dog race track constructed in accordance with our invention;

Fig. 2 is an enlarged transverse section thereof;

Fig. 3 is a transverse sectional view through the overhead track;

Fig. 4 is a plan view of what is shown in Figure 3.

Referring to Figure 2 it will be seen that the overhead structure around the rack track consists of the posts 10 having the outwardly projecting arms 11 and the trolley track 12 which is supported by a 2 x 6 beam 13. The trolley track 12 or car track is also formed of wood, preferably a 2 x 8 and the upper face of this car or trolley track on each side of the beam 13 carries the metallic conductors 14. The braces of the arms 11 may support electric lights 15 which will discharge downward toward the track. The track is substantially oval but may have any desired shape, as shown in Figure 1. Operating upon the track 12 is a more or less rectangular yoke 16 which may be of metal, angle iron, or any other suitable material for the purpose, and this yoke is adapted to embrace the track and extend below the same and the upper arms 17 carry at their inner ends the wheels 18 which are preferably mounted in ball bearings so as to be as easy running as possible. Mounted upon these arms 17 are the forwardly and inwardly extending arms 19 which at their ends carry the ball bearing rollers 20 which bear against the opposite faces of the beam 13. These rollers prevent any lateral movement of the yoke with relation to the track or permit only a very limited lateral movement while the wheels 18 rest upon the metallic conductors 14.

Mounted within the yoke in any suitable manner, is an electric motor 21, the motor shaft 22 of which is provided with the wheels 23 which bear against the under face of the track 12. These wheels bear frictionally against the under face of the track 12 and, of course, act to drive the trolley along the track. Extending downward from the yoke 16 is a rod or other equivalent member 24 which, at its lower end, carries the rabbit 25. The track 12 will be any desired distance above the surface of the ground or racing track and ordinarily is about 10 or 12′ from the ground. The rod, therefore, extends down into proximity to the ground and, as before remarked, carries upon it the rabbit or other lure. Preferably the lure is mounted with springs upon the lower end of the rod so that a dog may catch the rabbit or lure and pull it or maul it without necessarily breaking the supporting rod. The motor is connected by any suitable wiring 26 to the trolley wheels 18 so as to conduct current from one of the conductors to the motor and from the motor to the other return conductor. These conductors are, of course, to be connected to a source of electricity. The operation of the device will be obvious from what has gone before. The speed of the carriage or trolley upon the track is controlled from a central point, as from a judge's stand, tower or other place, and the speed of the motor may be controlled by means of a rheostat (not shown). Thus, the speed of the rabbit may be regulated in accordance with the probable speed of the dogs. The dogs are unleashed or let go just as the trolley is started and the dogs, of course, immediately chase after the rabbit which travels just in advance of the dogs, as many circuits of the track being made as desired.

The chief advantage of the construction illustrated is that it is very cheap to put up and that it cannot easily get out of order and permits of the replacement of a broken trolley and permits the re-running of the race in case any accident has happened. The ordinary dog racing devices known to us and which are commonly used are so heavily constructed that if an accident occurred and the trolley by any manner of means jumps the track or becomes jammed, the race must be given up and considerable time lost before the trolley can be removed and a new trolley substituted. This is not the case with our construction as it is an easy matter to remove the trolley and substitute a new one therefor.

We claim:—

1. A dog racing apparatus including an overhead track comprising a longitudinally extending vertically disposed beam and a horizontally disposed beam, conductors mounted upon the upper face of the horizontally disposed beam and on each side of the vertically disposed beam, a carriage comprising a yoke embracing the horizontally disposed beam, trolley wheels carried by the yoke and bearing against said conductors, guide rollers mounted upon the yoke and bearing on each side of the vertically disposed beam, a motor carried by the yoke, and wheels frictionally bearing against the under face of the track and driven by the motor, the yoke having a vertically depending lure support.

2. A dog racing apparatus comprising vertically disposed posts having outwardly projecting arms, a track mounted upon the arms consisting of a longitudinally extending beam and a horizontally disposed beam, conductors mounted upon the upper face of the horizontally disposed beam, a carriage including a yoke embracing the last named beam and having wheels bearing upon said conductors, angularly disposed arms mounted upon the yoke and having rollers bearing against the lateral faces of the longitudinally disposed beam, a motor carried directly on and by the yoke and having a motor shaft, traction wheels mounted upon the shaft and bearing against the under face of the horizontally disposed beam, electrical connections between the motor and trolley wheels, and a depending rod carrying a lure at its lower end.

3. A dog racing apparatus including an overhead track comprising a longitudinally extending, vertically disposed beam and a horizontally disposed beam extending laterally beyond the longitudinally extending beam, conductors mounted upon one face of the horizontally disposed beam, a carriage comprising a yoke embracing the horizontally disposed beam and depending below the beam, a motor carried by the yoke and disposed between the yoke and beam and having wheels frictionally engaging one face of the track, said wheels being driven by the motor, trolley wheels bearing against opposite faces of the track and engaging with said conductors, and means carried by the yoke for preventing lateral movement of the carriage with relation to the track, said carriage having a vertically depending lure support.

In testimony whereof we hereunto affix our signatures.

JACK NAUD.
SPERO MOCHE.